United States Patent
Nakajima

(10) Patent No.: US 10,093,246 B2
(45) Date of Patent: Oct. 9, 2018

(54) VEHICLE DRIVING ASSISTANCE DEVICE

(71) Applicant: Yazaki Corporation, Tokyo (JP)

(72) Inventor: Harutoshi Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/335,311

(22) Filed: Oct. 26, 2016

(65) Prior Publication Data

US 2017/0113626 A1    Apr. 27, 2017

(30) Foreign Application Priority Data

Oct. 27, 2015    (JP) .................................. 2015-210945

(51) Int. Cl.
| | | |
|---|---|---|
| G09G 5/00 | (2006.01) | |
| G09G 5/377 | (2006.01) | |
| B60R 11/02 | (2006.01) | |

(52) U.S. Cl.
CPC ............ B60R 11/0229 (2013.01); G09G 5/00 (2013.01); G09G 5/003 (2013.01); G09G 5/377 (2013.01); G09G 2340/12 (2013.01); G09G 2340/14 (2013.01); G09G 2380/10 (2013.01)

(58) Field of Classification Search
None
See application file for complete search history.

(56) References Cited

U.S. PATENT DOCUMENTS

| | | | | | |
|---|---|---|---|---|---|
| 5,504,482 | A | * | 4/1996 | Schreder | G01C 21/26 340/988 |
| 5,983,161 | A | * | 11/1999 | Lemelson | G01S 19/11 340/436 |
| 6,895,332 | B2 | * | 5/2005 | King | G01C 21/26 340/902 |
| 2004/0088105 | A1 | * | 5/2004 | Craine | B60K 37/02 701/468 |
| 2007/0050110 | A1 | * | 3/2007 | Kondoh | B60K 31/18 701/36 |
| 2007/0159354 | A1 | * | 7/2007 | Rosenberg | G08G 1/0965 340/902 |

(Continued)

FOREIGN PATENT DOCUMENTS

| | | |
|---|---|---|
| JP | 7-329638 A | 12/1995 |
| JP | 2003-259356 A | 9/2003 |

(Continued)

OTHER PUBLICATIONS

TomTom Reference Guide , Go Live 1000, 2013 (product released 2010) http://download.tomtom.com/open/manuals/LIVE/refman/TomTom-EU-LIVE-RG-en-gb.pdf*

(Continued)

*Primary Examiner* — Jason Pringle-Parker
(74) *Attorney, Agent, or Firm* — Kenealy Vaidya LLP

(57) ABSTRACT

A vehicle driving assistance device can include a display unit that displays a front pattern that is shaped like a vehicle front of a vehicle and is positioned within a forward view, and to superimpose the front pattern on a forward image that is an image of the forward view of the vehicle. A controller can be provided that can execute a process of controlling the display unit and causing the display unit to display driving assistance information for the vehicle, using the front pattern.

11 Claims, 8 Drawing Sheets

(56) References Cited

U.S. PATENT DOCUMENTS

2013/0173159 A1* 7/2013 Trum ................ G01C 21/3617
                                                         701/533

FOREIGN PATENT DOCUMENTS

| JP | 2006-173835 A | 6/2006 |
| JP | 2007-290570 A | 11/2007 |
| JP | 2011-230563 A | 11/2011 |
| JP | 2012-133614 A | 7/2012 |
| JP | 2014-46835 A | 3/2014 |

OTHER PUBLICATIONS

Japanese Office Action for the related Japanese Patent Application No. 2015-210945 dated Nov. 21, 2017.
German Office Action for the related German Patent Application No. 10 2016 221 017.3 dated May 3, 2018.

* cited by examiner

VEHICLE DRIVING ASSISTANCE DEVICE

CROSS-REFERENCE TO RELATED APPLICATION(S)

The present application claims priority to and incorporates by reference the entire contents of Japanese Patent Application No. 2015-210945 filed in Japan on Oct. 27, 2015.

BACKGROUND

1. Field

The presently disclosed subject matter relates to a vehicle driving assistance device.

2. Description of the Related Art

As a technique related to a conventional vehicle driving assistance device, for example, Japanese Patent Application Laid-open No. 2007-290570 discloses a vehicle display device that captures a rearward view of a vehicle using a vehicle rearward imaging camera, that displays the image of the captured rearward view on a display being provided at a position viewable by a driver, and that displays the image of the rearward view by superimposing the image of the rearward view on a contour image of the window at the rearward side of the vehicle.

In the vehicle display device disclosed in Japanese Patent Application Laid-open No. 2007-290570 described above, for example, there is room for further improvement in terms of driving assistance in combination with the displaying of the forward view side of a vehicle.

SUMMARY

The presently disclosed subject matter has been made in view of the above and other circumstances. According to an aspect of the presently disclosed subject matter a vehicle driving assistance device can perform driving assistance in combination with the displaying of the forward view of a vehicle.

A vehicle driving assistance device according to one aspect of the presently disclosed subject matter includes a display unit configured to display a front pattern that is a pattern shaped like a vehicle front of a vehicle being positioned within a forward view, by superimposing the front pattern on a forward image that is an image of the forward view of the vehicle; and a controller configured to execute a process of controlling the display unit and causing the display unit to display driving assistance information for the vehicle, using the front pattern.

According to another aspect of the presently disclosed subject matter, in the vehicle driving assistance device, the display unit may display the front pattern by superimposing the front pattern on the forward image, at a position corresponding to a position of the vehicle front in the forward view.

According to still another aspect of the presently disclosed subject matter, in the vehicle driving assistance device, the front pattern may include a main front pattern that includes a front-to-rear direction pattern in the forward image along a virtual vehicle front-to-rear direction, and a left-to-right direction pattern that is in the forward image along a virtual vehicle left-to-right direction intersecting with the virtual vehicle front-to-rear direction and that forms a corner by intersecting with the front-to-rear direction pattern.

According to still another aspect of the presently disclosed subject matter, in the vehicle driving assistance device, the main front pattern may include a pair of main front patterns in which the front-to-rear direction patterns and the left-to-right direction patterns face each other in a line symmetric manner with respect to a reference line that is orthogonal to the virtual vehicle left-to-right direction, and the pair of the left-to-right direction patterns are positioned between a pair of the corners, and ends at a side opposite from the corners of the front-to-rear direction patterns extend to periphery of the forward image.

In the vehicle driving assistance device described above, the front pattern may include a sub-front pattern that surrounds the main front pattern, and can transmit visibly the forward image that is superimposed with the main front pattern and the sub-front pattern.

In the vehicle driving assistance device described above, the controller can execute a process of causing the display unit to display notification of driving state of the vehicle, by changing a display mode of the front pattern, as the driving assistance display.

In the vehicle driving assistance device described above, the display unit can display a front image that is an image representing the front pattern, by superimposing the front image on the forward image.

The above and other features, advantages and technical and industrial significance of the disclosed subject matter will be better understood by reading the following detailed description of present exemplary embodiments of the disclosed subject matter, when considered in connection with the accompanying drawings.

DETAILED DESCRIPTION OF EXEMPLARY EMBODIMENTS

Hereinafter, embodiments according to the presently disclosed subject matter will be described in detail with reference to the accompanying drawings. It is to be noted that the presently disclosed subject matter is not limited to the disclosed embodiments. Furthermore, components in the following embodiments include those that can be easily replaced by those skilled in the art or those substantially the same as the components in the embodiments.

Exemplary Embodiment

Figure 1:
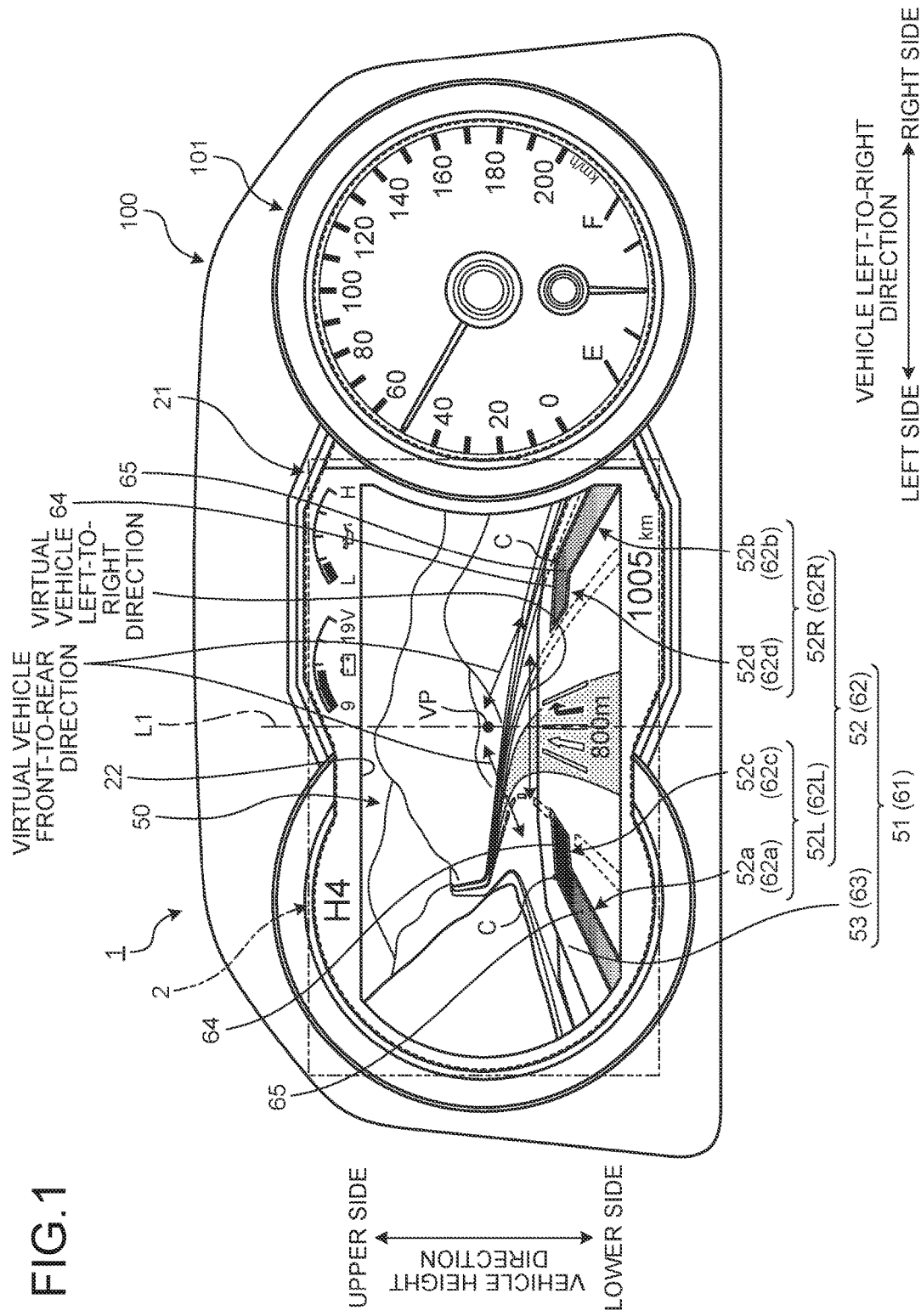
FIG. 1 is a front elevation view illustrating a schematic configuration of a vehicle display device applied with a vehicle driving assistance device according to an embodiment of the presently disclosed subject matter.
Figure 2:
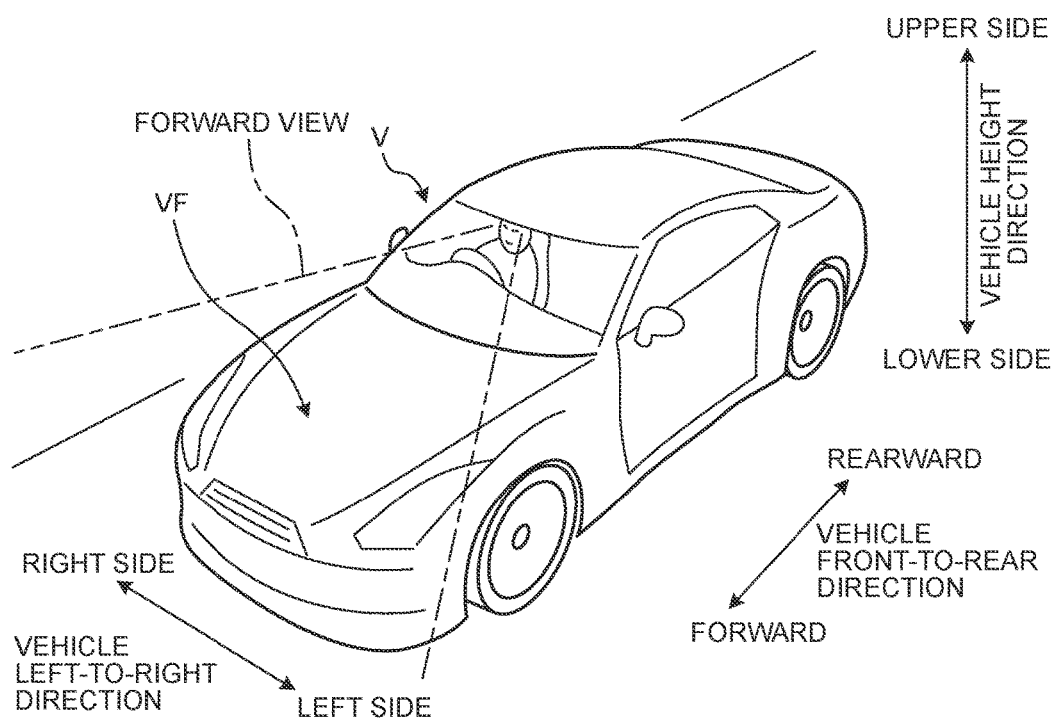
FIG. 2 is a schematic perspective view for explaining directions of a vehicle that is mounted with the vehicle display device applied with the vehicle driving assistance device according to the embodiment of FIG. 1.
Figure 3:
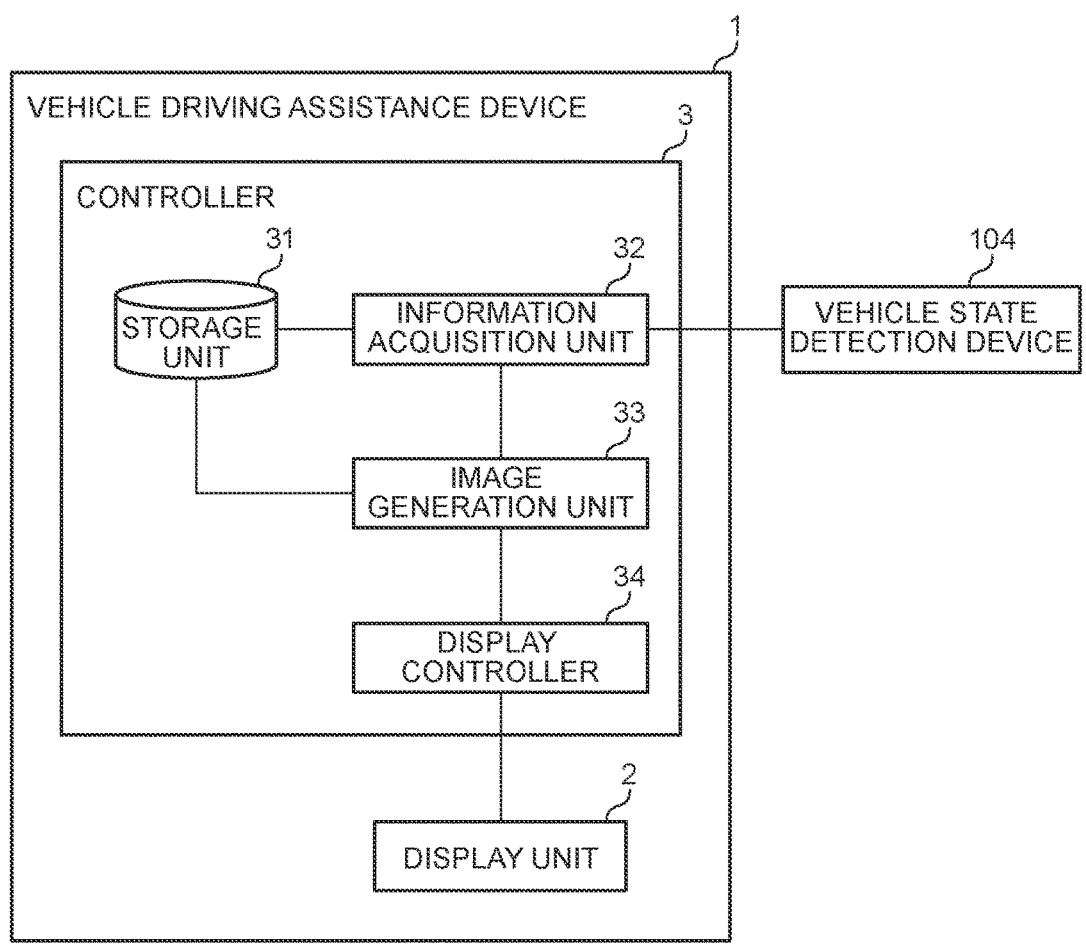
FIG. 3 is a block diagram illustrating a schematic configuration of the vehicle display device applied with the vehicle driving assistance device according to the embodiment of FIG. 1.
Figure 4:
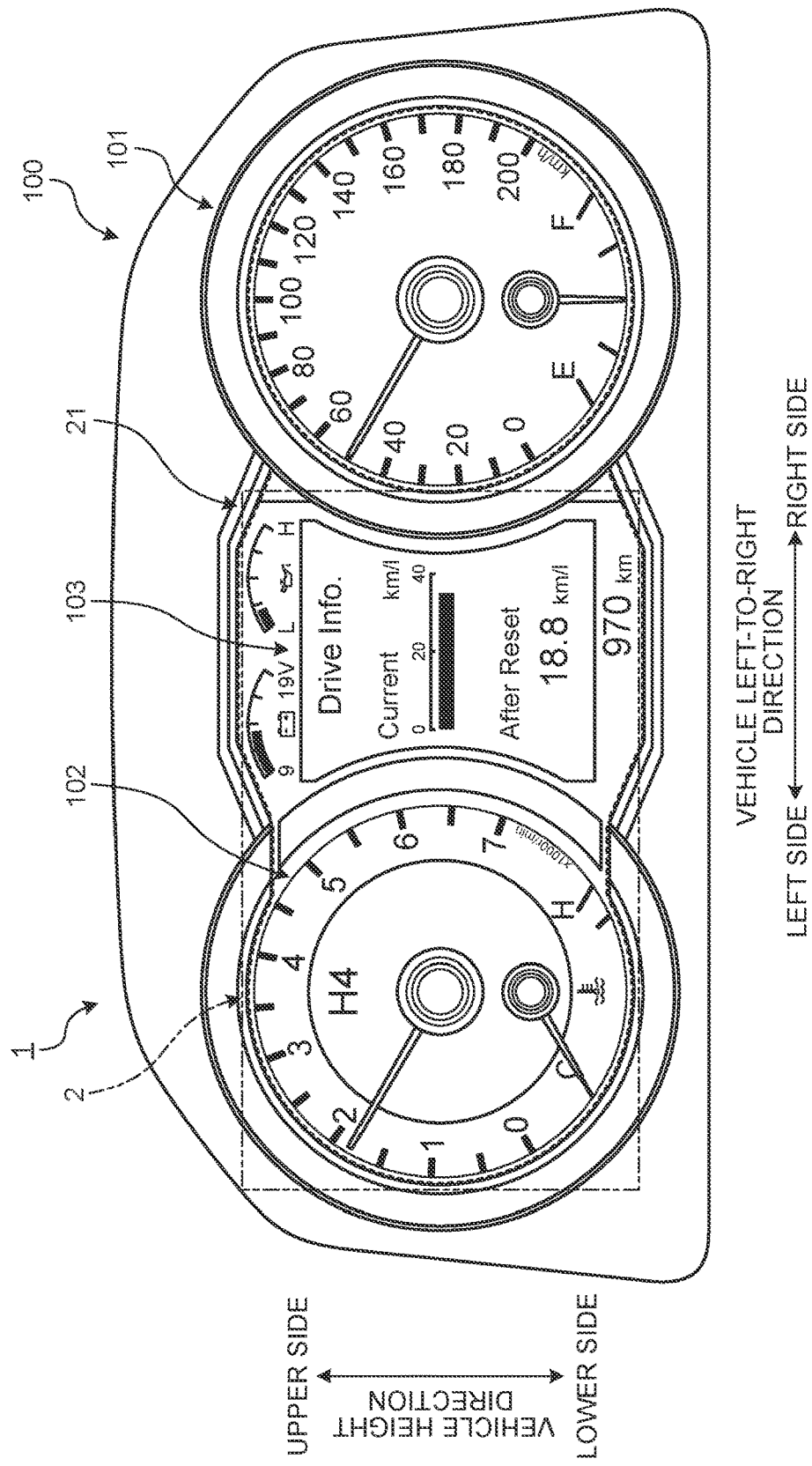
FIG. 4 is a front elevation view illustrating a schematic configuration of the vehicle display device applied with the vehicle driving assistance device according to the embodiment of FIG. 1.
Figure 5:
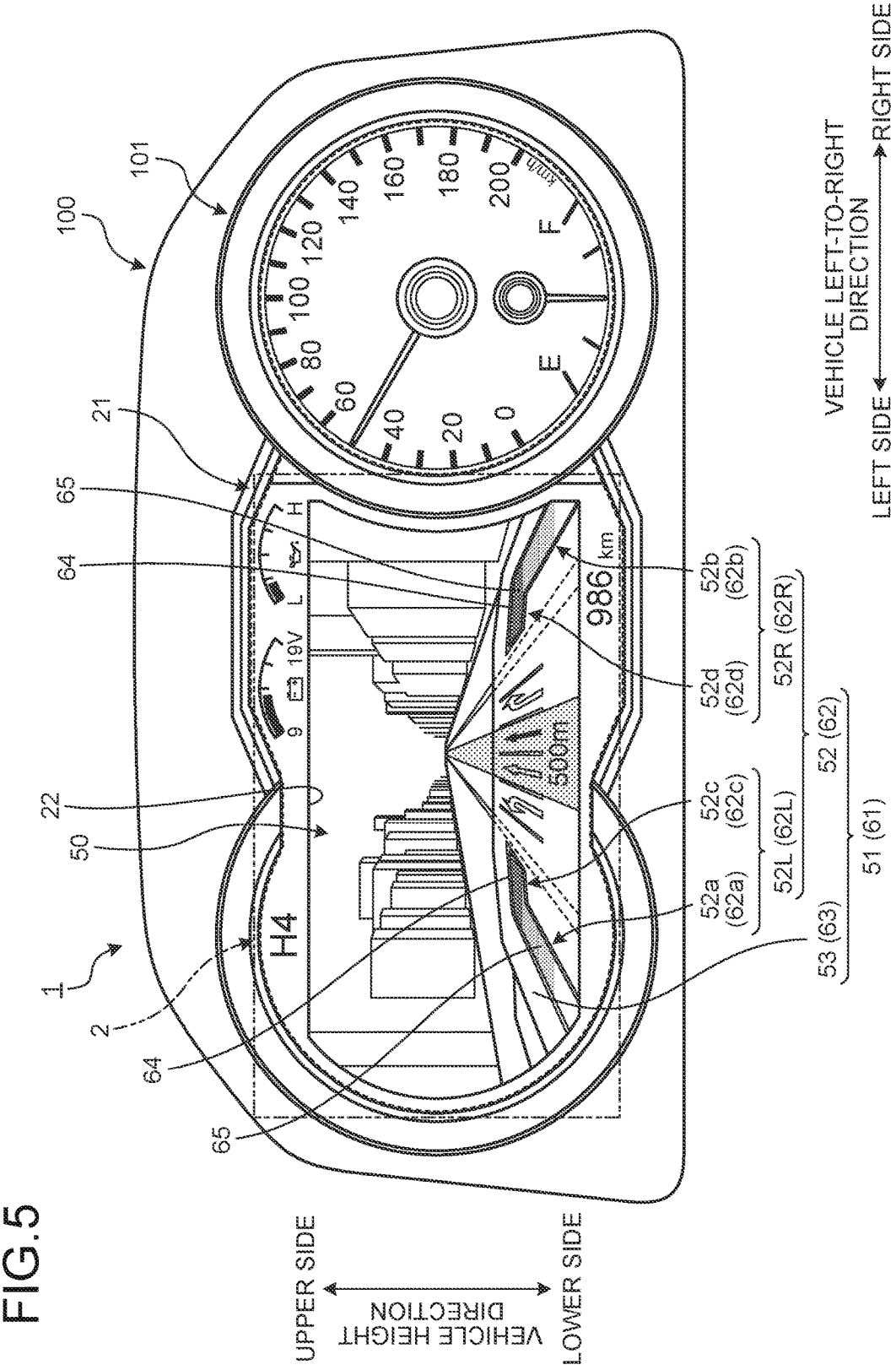
FIG. 5 is a front elevation view illustrating a schematic configuration of the vehicle display device applied with the vehicle driving assistance device according to the embodiment of FIG. 1.

FIG. 1, FIG. 4, and FIG. 5 are front elevation views each illustrating a schematic configuration of a vehicle display device applied with a vehicle driving assistance device according to an exemplary embodiment. FIG. 2 is a schematic perspective view for explaining directions of a vehicle that is mounted with the vehicle display device applied with the vehicle driving assistance device according to the embodiment of FIG. 1. FIG. 3 is a block diagram illustrating a schematic configuration of the vehicle display device applied with the vehicle driving assistance device according to the embodiment of FIG. 1.

A vehicle driving assistance device 1 according to the embodiment illustrated in FIG. 1 is applied as a part of a vehicle display device 100. The vehicle display device 100 is what is called an on-vehicle meter. For example, the vehicle display device 100 can be mounted on an instrument panel that is provided on a dashboard of a vehicle V (see FIG. 2), and display various types of information relating to the vehicle V, as information to be provided for driving the vehicle V. For example, the vehicle display device 100 illustrated in FIG. 1 includes an analog speedometer 101 that displays the vehicle speed of the vehicle V on which the vehicle display device 100 is mounted, as information relating to the vehicle V, and the like. The vehicle driving assistance device 1 can be built into the vehicle display device 100, with the analog speedometer 101 and the like.

In the following explanation, as illustrated in FIG. 1 and FIG. 2, in the vehicle V on which the vehicle display device 100 is mounted, a "vehicle front-to-rear direction" typically corresponds to a whole length direction of the vehicle V, and furthermore, corresponds to a direction along the forward and reverse direction of the vehicle V. A "vehicle left-to-right direction" typically corresponds to a vehicle width direction of the vehicle V. A "vehicle height direction" typically corresponds to a vehicle height direction of the vehicle V. Typically, the vehicle front-to-rear direction and the vehicle left-to-right direction are directions along a horizontal direction, and the vehicle height direction is a direction along a vertical direction, while the vehicle V is positioned on a horizontal plane. The vehicle front-to-rear direction is a first direction, the vehicle left-to-right direction is a second direction, and the vehicle height direction is a third direction. The vehicle front-to-rear direction, the vehicle left-to-right direction, and the vehicle height direction are orthogonal to each other. In the following explanation, in the vehicle front-to-rear direction, the side toward which the vehicle V moves forward may be referred to as "forward", and the side toward which the vehicle V moves rearward may be referred to as "rearward". In the vehicle left-to-right direction, the left side (left side in FIG. 1) facing forward in the vehicle front-to-rear direction may be referred to as "left side", and the right side (right side in FIG. 1) facing forward in the vehicle front-to-rear direction may be referred to as "right side". In the vehicle height direction, the upper side in the vertical direction may be referred to as "upper side", and the lower side in the vertical direction may be referred to as "lower side". Also, in the following explanation, a "forward view" of the vehicle V typically corresponds to a view being viewed forward in the vehicle front-to-rear direction from a visual observing position of a driver of the vehicle V, and is a viewing range that can be viewed through the front window. Furthermore, an "image" in the following explanation includes a moving image that changes constantly, in addition to what is called a still image.

As illustrated in FIG. 1, the vehicle driving assistance device 1 according to the present exemplary embodiment is built into the vehicle display device 100 and is adjacent to the left side of the analog speedometer 101 in the vehicle left-to-right direction. The vehicle driving assistance device 1 according to the present embodiment implements driving assistance in combination with the displaying of the forward view side of the vehicle V. This is possible by displaying a front pattern 51 that is a pattern shaped like a vehicle front VF of the vehicle V being positioned within the forward view, by superimposing the front pattern 51 on a forward image 50 that is an image of the forward view of the vehicle V. The displayed front pattern 51 serves as a mark of the position of the driven vehicle in the forward image 50, and is also used as an indicator for a driving assistance system. Hereinafter, configurations of the vehicle driving assistance device 1 will be described in detail with reference to the accompanying drawings.

To be more precise, as illustrated in FIG. 1 and FIG. 3, the vehicle driving assistance device 1 includes a display unit 2 and a controller 3.

The display unit 2 is mounted on the vehicle V and displays driving assistance information for the vehicle V. The display unit 2 of the present embodiment can display the front pattern 51 that is a pattern shaped like the vehicle front VF of the vehicle V being positioned within the forward view, by superimposing the front pattern 51 on the forward image 50 that is an image of the forward view of the vehicle V. In this example, the display unit 2 displays various images, and displays both images of the forward image 50 as well as a front image 61 that is an image representing the front pattern 51. The display unit 2 displays the front image 61 representing the front pattern 51, by superimposing the front image 61 on the forward image 50.

For example, the display unit 2 may be a thin liquid crystal display. However, it is not limited thereto, and the display unit 2 may also be a plasma display, an organic electroluminescence (EL) display, and the like. In the display unit 2, a display area 21 that displays various images such as the forward image 50 and the front image 61 is positioned facing the driver's side (typically, the rearward side in the vehicle front-to-rear direction) so that the driver of the vehicle V can view the display area 21. The display area 21 is positioned adjacent to the left side of the analog speedometer 101 in the vehicle left-to-right direction. In this example, the display area 21 is formed in a substantially rectangular shape along the vehicle left-to-right direction, and includes end plates, accessories, and the like mounted at a periphery thereof in an overlapping manner. In this example, the display unit 2 displays the forward image 50, the front image 61 representing the front pattern 51, and the like on a main display area 22 that is a main area for displaying the driving assistance, in the display area 21. The main display area 22 is positioned substantially at the center of the display unit 2, and has a substantially rectangular shape along the vehicle left-to-right direction with curved ends thereof in the vehicle left-to-right direction. However, it is not limited thereto. The display unit 2 displays various images including the forward image 50, the front image 61, and the like based on the control by the controller 3.

The display unit 2 can also display other information relating to the vehicle V such as an accumulated mileage, a cooling water thermometer, and a battery storage amount, in the area surrounding the main display area 22 in the display area 21. The display unit 2 can also display other information relating to the vehicle V on the entire display area 21, by not displaying the border of the main display area 22, as illustrated in FIG. 4 and the like, from the state where the driving assistance is displayed on the main display area 22, as illustrated in FIG. 1 and the like. For example, in the example of FIG. 4, a tachometer image 102 that schematically indicates a tachometer for displaying the output rotation speed of the drive power source, a drive information (Drive Info.) image 103, and the like may also be displayed.

As illustrated in FIG. 1 and FIG. 5, the forward image 50 displayed by the display unit 2 is an image of a forward view of the vehicle V, and generated by the controller 3, which will be described below. The forward image 50 typically corresponds to an image of a view being viewed forward in the vehicle front-to-rear direction from the visual observing position of the driver of the vehicle V. Furthermore, the forward image 50 is an image of a viewing range that can be viewed from the visual observing position of the driver through the front window. The forward image 50 changes constantly with the change in the forward view of the vehicle V, while the vehicle V is traveling. The angle of view of the forward image 50 is determined in advance so that the forward image 50 is an image corresponding to the viewing range that can be viewed from the visual observing position of the driver, based on experiments, simulations, and the like, according to the geometric arrangement of the driver's seat in the vehicle V, the average physique of the driver(s), and the like. The angle of view determined in advance may be a fixed angle of view, or may vary, by detecting a viewing position and the like of the driver, depending on the detected viewing position and the like. For example, as illustrated in FIG. 1, the forward image 50 may be an image captured by an imaging device that captures an image of the forward view of the vehicle V. Also, as illustrated in FIG. 5, the forward image 50 may be a virtual three-dimensional image that is read out from a storage unit 31, which will be described below, based on the current position information (global positioning system (GPS) information) of the vehicle V, and the like.

As illustrated in FIG. 1 and FIG. 5, the front image 61 representing the front pattern 51 is an image that represents the pattern shaped like the vehicle front VF of the vehicle V being positioned within the forward view of the vehicle V. The front image 61 is an image generated by the controller 3, which will be described below. The vehicle front VF of the vehicle V being positioned within the forward view of the vehicle V typically corresponds to a part of the vehicle V being positioned within the forward view that is the forward view being viewed forward in the vehicle front-to-rear direction from the visual observing position of the driver of the vehicle V. Furthermore, the vehicle front VF of the vehicle V is a part of the vehicle V in a range that can be viewed from the visual observing position of the driver through the front window. The vehicle front VF typically includes a hood of the vehicle V. The front pattern 51 that is shaped like the vehicle front VF includes a pattern representing the shape of the vehicle front VF including the hood of the vehicle V as it is, and a pattern representing an abstraction of the shape of the vehicle front VF including the hood of the vehicle V. The front image 61 representing the front pattern 51 represents the front pattern 51 as an image. Basically, the front image 61 representing the front pattern 51 does not change with the change in the forward view of the vehicle V, while the vehicle V is traveling. However, the front image 61 may change depending on the content of the driving assistance display. The shape of the front image 61 representing the front pattern 51 is determined in advance so that the front image 61 is shaped like the vehicle front VF of the vehicle V being positioned within the forward view that is the view being viewed forward in the vehicle front-to-rear direction from the visual observing position of the driver of the vehicle V, to be more specific, so that the front image 61 is shaped like the vehicle front VF of the vehicle V within a range that can be viewed from the visual observing position of the driver through the front window, based on the experiments, simulations, and the like, according to the geometric arrangement of the driver's seat in the vehicle V, the average physique of the drivers, and the like. The shape of the front image 61 determined in advance may be a fixed shape, or may vary, by detecting a viewing position and the like of the driver, depending on the detected viewing position and the like.

The front pattern 51 represented by the front image 61 of the present embodiment includes a main front pattern 52 and a sub-front pattern 53.

The main front pattern 52 is a main portion that is shaped like the vehicle front VF. In this example, the main front pattern 52 is an abstraction of the shape of the actual vehicle front VF that is positioned within the forward view being the forward view being viewed forward in the vehicle front-to-rear direction from the visual observing position of the driver of the vehicle V, and that can be viewed from the visual observing position of the driver through the front window. For example, the main front pattern 52 is an abstraction of the shape of the vehicle front VF and is represented by a perspective view.

The main front pattern 52 of the present embodiment includes front-to-rear direction patterns 52a and 52b, and left-to-right direction patterns 52c and 52d. In this example, the main front pattern 52 includes a pair of the front-to-rear direction pattern 52a and the front-to-rear direction pattern 52b, and a pair of the left-to-right direction pattern 52c and the left-to-right direction pattern 52d. The front-to-rear direction patterns 52a and 52b are patterns in the forward image 50 along a virtual vehicle front-to-rear direction. The left-to-right direction patterns 52c and 52d are patterns in the forward image 50 along a virtual vehicle left-to-right direction that intersects with the virtual vehicle front-to-rear direction, and respectively intersect with the front-to-rear direction patterns 52a and 52b to form corners C.

In this example, the virtual vehicle front-to-rear direction in the forward image 50 is not the actual vehicle front-to-rear direction of the vehicle V, as illustrated in FIG. 1, but the virtual vehicle front-to-rear direction in a virtual space represented by the forward image 50. Typically, the virtual vehicle front-to-rear direction corresponds to a depth direction in the virtual space represented by the forward image 50. More specifically, for example, the virtual vehicle frontto-rear direction in the forward image 50 is a direction along the traveling direction of a virtual vehicle V in the virtual space represented by the forward image 50, and is also a direction toward the vicinity of a vanishing point (VP) in the forward image 50 that is represented by a perspective view. In this example, the pair of the front-to-rear direction pattern 52a and the front-to-rear direction pattern 52b along the virtual vehicle front-to-rear direction form a shape (substantially trapezoidal shape) in which the interval at the upper side in the vehicle height direction is relatively narrow and the interval at the lower side in the vehicle height direction is relatively wide, while viewing the main display area 22 from the front. The virtual vehicle left-to-right direction in the forward image 50 is not the actual vehicle left-to-right direction of the vehicle V, but the virtual vehicle left-to-right direction in the virtual space represented by the forward image 50. Typically, the virtual vehicle left-to-right direction corresponds to the width direction of the virtual space represented by the forward image 50. More specifically, for example, the virtual vehicle left-to-right direction in the forward image 50 is a direction that intersects with the traveling direction of the virtual vehicle V in the virtual space that is represented by the forward image 50. In this example, the virtual vehicle left-to-right direction is a direction along the actual vehicle left-to-right direction of the vehicle V.

The main front pattern 52 includes a pair of main front patterns in which the front-to-rear direction patterns 52a and 52b and the left-to-right direction patterns 52c and 52d face each other in a line symmetric manner with respect to a reference line L1 that is orthogonal to the virtual vehicle left-to-right direction in the forward image 50, and the pair of the left-to-right direction patterns 52c and 52d are positioned between a pair of the corners C that are formed by the front-to-rear direction patterns 52a and 52b and the left-to-right direction patterns 52c and 52d. In this example, the reference line L1 is a virtual line that extends along the actual vehicle height direction of the vehicle V. More specifically, the front-to-rear direction pattern 52a that is at the left side of the virtual vehicle left-to-right direction and the left-to-right direction pattern 52c that is at the left side of the virtual vehicle left-to-right direction intersect with each other to form a corner C, and form a front left pattern 52L that is shaped like the corner at the forward side in the vehicle front-to-rear direction as well as at the left side in the vehicle left-to-right direction, of the vehicle front VF. In the front left pattern 52L, the front-to-rear direction pattern 52a extends from the corner C toward the near side (driver side) along the virtual vehicle front-to-rear direction, and the left-to-right direction pattern 52c extends from the corner C toward the right side along the virtual vehicle left-to-right direction. Consequently, the front left pattern 52L is formed substantially in an L-shape, as a whole. The front-to-rear direction pattern 52b that is at the right side in the virtual vehicle left-to-right direction and the left-to-right direction pattern 52d that is at the right side in the virtual vehicle left-to-right direction intersect with each other to form a corner C, and form a front right pattern 52R that is shaped like the corner at the forward side in the vehicle front-to-rear direction as well as at the right side in the vehicle left-to-right direction, of the vehicle front VF. In the front right pattern 52R, the front-to-rear direction pattern 52b extends from the corner C toward the near side (driver side) along the virtual vehicle front-to-rear direction, and the left-to-right direction pattern 52d extends from the corner C toward the left side along the virtual vehicle left-to-right direction. Consequently, the front right pattern 52R is formed substantially in an L-shape, as a whole. The front left pattern 52L and the front right pattern 52R face each other in a line symmetric manner with respect to the reference line L1, so that the corners C are positioned outside in the virtual vehicle left-to-right direction. Hence, as described above, the front-to-rear direction patterns 52a and 52b and the left-to-right direction patterns 52c and 52d face each other in a line symmetric manner with respect to the reference line L1, and the pair of the left-to-right direction patterns 52c and 52d are positioned between the pair of the corners C. Furthermore, in this example, the ends at the side opposite from the corners C of the front-to-rear direction patterns 52a and 52b in the main front pattern 52 extend to the periphery of the lower side of the forward image 50 in the vehicle height direction (in other words, the periphery of the lower side of the main display area 22 in the vehicle height direction), and the left-to-right direction pattern 52c and the left-to-right direction pattern 52d are being split.

The sub-front pattern 53 is a secondary portion shaped like the vehicle front VF, and is a pattern that surrounds the main front pattern 52. In this example, the sub-front pattern 53 has a shape representing the exterior shape of the actual vehicle front VF almost as it is, that is positioned within the forward view being viewed forward in the vehicle front-to-rear direction from the visual observing position of the driver of the vehicle V, and that can be viewed from the visual observing position of the driver through the front window. The sub-front pattern 53 is configured so as to surround the front left pattern 52L and the front right pattern 52R of the main front pattern 52. The sub-front pattern 53 extends along the periphery of the lower side of the forward image 50 in the vehicle height direction (in other words, the periphery of the lower side of the main display area 22 in the vehicle height direction).

The front image 61 representing the front pattern 51 includes an image representing each of the patterns described above. In other words, the front image 61 includes a main front image 62 representing the main front pattern 52, and a sub-front image 63 representing the sub-front pattern 53. The main front image 62 includes a front-to-rear direction image 62a representing the front-to-rear direction pattern 52a, a front-to-rear direction image 62b representing the front-to-rear direction pattern 52b, a left-to-right direction image 62c representing the left-to-right direction pattern 52c, and a left-to-right direction image 62d representing the left-to-right direction pattern 52d. The front-to-rear direction image 62a and the left-to-right direction image 62c form a front left image 62L representing the front left pattern 52L. The front-to-rear direction image 62b and the left-to-right direction image 62d form a front right image 62R representing the front right pattern 52R. In this example, as will be described below, in the front left image 62L and the front right image 62R that form the main front image 62, the display mode of a frame-shaped hollowed-out portion changes depending on the content of the driving assistance. The pieces of image data representing the front image 61 can be stored in advance in the storage unit 31, which will be described below.

The display unit 2 then displays the front image 61 representing the front pattern 51, by superimposing the front image 61 on the forward image 50, at a position corresponding to the position of the vehicle front VF in the forward view. More specifically, the display unit 2 displays the front image 61 by superimposing the front image 61 on the forward image 50 so that the position of the vehicle front VF that can be viewed from the visual observing position of the driver in the forward view and the position of the front pattern 51 in the forward image 50 have an equivalent positional relation (typically, the lower area in the forward image 50 (the area lower than the center in the vehicle height direction)). With the front image 61 representing the front pattern 51, the relative positions of the front pattern 51 and the front image 61 in the forward image 50 can be determined in advance, based on the experiments, simulations, and the like, according to the geometric arrangement of the driver's seat in the vehicle V, the average physique of the driver(s), and the like. The relative position of the front image 61 in the forward image 50 determined in advance may be fixed, or may vary, by detecting a viewing position and the like of the driver depending on the detected viewing position and the like. In this example, the front image 61 representing the front pattern 51 is displayed so as to visibly transmit the forward image 50 that is superimposed with the main front image 62 representing the main front pattern 52 and the sub-front image 63 representing the sub-front pattern 53.

The controller 3 controls the display unit 2 and controls the display of the display unit 2. In this example, the controller 3 also controls the image displayed by the display unit 2. In the explanation, the controller 3 of the present embodiment is also used as a control device that controls the units of the vehicle display device 100. However, it is not limited thereto, and the controller 3 may be configured separately from the control device, and the controller 3 and the control device may transmit and receive detection signals, drive signals, and information such as a control instruction with each other. The controller 3 can include an electronic circuit that includes a known microcomputer having a central processing unit (CPU), a read-only memory (ROM), a random-access memory (RAM), and an interface, as a main component. Various sensors and detectors that configure a vehicle state detection device 104 for detecting the state of the vehicle V are electrically connected to the controller 3, and the controller 3 receives an electric signal corresponding to the detection result. The controller 3 is electrically connected to the display unit 2, and outputs a drive signal to the display unit 2. The controller 3 outputs the drive signal to the display unit 2 and controls the drive of the display unit 2, by executing the stored control programs based on various input signals and the like that have been received from the various sensors, the detectors, and the like.

To be more precise, as illustrated in FIG. 3, the controller 3 functionally and conceptually can include the storage unit 31, an information acquisition unit 32, an image generation unit 33, and a display controller 34. The storage unit 31, the information acquisition unit 32, the image generation unit 33, and the display controller 34 can transmit and receive various types of information to and from various devices that are electrically connected.

The storage unit 31 is a storage device such as a memory, and stores therein conditions and data necessary or recommended for various processes by the controller 3, various programs that are executed by the controller 3, and the like. For example, the storage unit 31 can store therein in advance three-dimensional map image data of virtual space that is to be read out based on the current position information of the vehicle V and that has been modeled in advance, shape information of the front image 61, image data of the front image 61 including relative position information of the front image 61 in the forward image 50, and the like. The storage unit 31 can also temporarily store therein various types of information acquired by the information acquisition unit 32.

The information acquisition unit 32 is a portion that acquires various types of information relating to the vehicle V. The information acquisition unit 32 is electrically connected to the vehicle state detection device 104 and receives an electric signal corresponding to the detection result from the vehicle state detection device 104. In this example, as described above, the vehicle state detection device 104 includes various sensors and detectors that detect the state of the vehicle V on which the vehicle driving assistance device 1 is mounted. For example, as the various sensors and detectors, the vehicle state detection device 104 may include at least one of an imaging device such as a charge-coupled device (CCD) camera that takes single or consecutive (e.g., video) images of the forward view of the vehicle V, various types of radars and sonars that monitor the existence of exterior objects around the vehicle V, a detector such as a camera or the like that recognizes white lines of the lane on which the vehicle V is traveling, a vehicle speed sensor that detects the vehicle speed of the vehicle V, an acceleration sensor that detects the acceleration applied to each direction of the vehicle body of the vehicle V, a GPS receiver that receives current position information (GPS information) of the vehicle V, and the like. For example, the imaging device can be provided on the vehicle front VF of the vehicle V so that the captured image has a predetermined angle of view to be the forward image 50 corresponding to the viewing range that the driver can view from the visual observing position. The information acquisition unit 32 acquires information representing the state of the vehicle V that is detected by the vehicle state detection device 104 (such as an image of the forward view of the vehicle V, information on existence of exterior objects around the vehicle V, information on white or colored lines of the lane on which the vehicle V is traveling, the vehicle speed of the vehicle V, acceleration generated on the vehicle V, current position information (GPS information) of the vehicle V, and the like). The vehicle state detection device 104 may also include a processing unit that performs the processes of the driving assistance system in the vehicle V. The information acquisition unit 32 can also acquire driving assistance instruction information from the processing unit that performs the processes of the driving assistance system. Also, the information acquisition unit 32 is electrically connected to the storage unit 31, and can store the acquired various types of information in the storage unit 31.

The image generation unit 33 is a portion that generates display image data that is image data to be displayed on the display unit 2. The image generation unit 33 is electrically connected to the storage unit 31 and the information acquisition unit 32, and generates display image data based on the image data that is stored in the storage unit 31 and various types of information that are acquired by the information acquisition unit 32. The image generation unit 33 generates image data representing the forward image 50, based on the image of the forward view of the vehicle V, the three-dimensional map image data, and the like. The image of the forward view of the vehicle V is captured by the imaging device that forms the vehicle state detection device 104 and is acquired by the information acquisition unit 32. The three-dimensional map image data is read out from the storage unit 31, based on the current position information of the vehicle V acquired by the information acquisition unit 32. The image generation unit 33 reads out the image data of the front image 61 from the storage unit 31, and generates display image data that is to be finally displayed on the display unit 2, by superimposing the front image 61 representing the front pattern 51 on the forward image 50. As described above, the image generation unit 33 generates display image data in which the front image 61 representing the front pattern 51 is superimposed on the forward image 50, at the position corresponding to the position of the vehicle front VF in the forward view. In this example, the image generation unit 33 generates display image data that transmits the forward image 50 that is superimposed with the main front image 62 and the sub-front image 63 forming the front image 61. For example, the image generation unit 33 sequentially generates the display image data in accordance with the forward image 50 that changes constantly while the vehicle V is traveling, for every predetermined control period.

The display controller 34 is a portion that causes the display unit 2 to display an image, based on the display image data generated by the image generation unit 33. The display controller 34 is electrically connected to the display unit 2 and the image generation unit 33, and controls the image to be actually displayed on the display unit 2, based on the display image data that is generated by the image generation unit 33. Consequently, the display controller 34 causes the display unit 2 to display the front image 61 representing the front pattern 51, by superimposing the front image 61 on the forward image 50, at a position corresponding to the position of the vehicle front VF in the forward view. More particularly, the display controller 34 causes the display unit 2 to display the front image 61 representing the front pattern 51, by superimposing the front image 61 on the forward image 50 so that the position of the vehicle front VF that can be viewed from the visual observing position of the driver in the forward view and the position of the front pattern 51 in the forward image 50 have an equivalent positional relation. In this example, the display controller 34 causes the display unit 2 to display the main front image 62 and the sub-front image 63, by making the main front image 62 and the sub-front image 63 visibly transmit the forward image 50, that is superimposed with the main front image 62 and the sub-front image 63 forming the front image 61.

The controller 3 according to the present embodiment can execute a process of controlling the display unit 2 and causing the display unit 2 to display driving assistance information for the vehicle V using the front pattern 51. In other words, as described above, the controller 3 causes the display unit 2 to display the front image 61 representing the front pattern 51, by superimposing the front image 61 on the forward image 50, and displays driving assistance by using the front image 61 representing the front pattern 51 as an indicator for the driving assistance system.

In this case, in the controller 3, the image generation unit 33 generates display image data on the basis of driving assistance display, based on the information acquired by the information acquisition unit 32, the image data stored in the storage unit 31, and the like. The display controller 34 then causes the display unit 2 to display an image on the basis of the driving assistance display, on the basis of the display image data based on the driving assistance display that is generated by the image generation unit 33. In the following explanation, when a series of processes related to the image display performed by the information acquisition unit 32, the image generation unit 33, and the display controller 34 need not be differentiated, the processes are simply referred to as a process performed by the controller 3, to simplify the explanation.

The controller 3 of the present embodiment can execute a process of causing the display unit 2 to display notification of the driving state of the vehicle V, by changing the display mode of the front image 61, as the driving assistance display. In this example, changing the display mode of the front image 61 means to change the display mode of the front pattern 51 to be displayed by the front image 61.

As an example, as illustrated in FIG. 1 and FIG. 5, the controller 3 of the present embodiment causes the display unit 2 to display the front left image 62L and the front right image 62R that form the main front image 62 in the front image 61 representing the front pattern 51, by separating the front left image 62L and the front right image 62R into a frame portion 64 that is being hollowed out, and an indicator portion 65 that is surrounded by the frame portion 64. The controller 3 then displays the driving assistance by changing the display mode of the indicator portion 65 depending on the content of the driving assistance information. For example, the controller 3 changes the display mode of the indicator portion 65, by changing the hue, tone, value, size, and the like, to cause the display unit 2 to display the notification of the driving state of the vehicle V.

For example, if there is no information to be notified to the driver of the vehicle V, in the information detected by the vehicle state detection device 104, as illustrated in FIG. 5, the controller 3 makes the hue, tone, value, and size of the indicator portions 65 of both of the front left image 62L and the front right image 62R to be relatively less likely to be viewed (for example, in white color or in color similar to the background color of the forward image 50, or by increasing the degree of transparency). The display mode illustrated in FIG. 5 is to notify the driver of the vehicle V that there is no information to be notified. This can also be referred to as a mode of the driving assistance display of the vehicle driving assistance device 1.

If there is information to be notified to the driver of the vehicle V in the information detected by the vehicle state detection device 104, the controller 3 displays and emphasizes the indicator portion 65 of either or both of the front left image 62L and the front right image 62R, by making the hue, tone, value, and size of the indicator portion 65 of either or both of the front left image 62L and the front right image 62R to be relatively likely to be viewed (for example, by setting a warm color group such as red or a color different from the background color of the forward image 50, or by reducing the degree of transparency). For example, in the example of FIG. 1, when it is possible to determine that the driving state of the vehicle V is as such that the vehicle V may deviate from the current traveling lane toward the left side in the vehicle left-to-right direction, based on the information detected by the vehicle state detection device 104 (such as information relating to the white or other color lines of the lane on which the vehicle V is traveling or the driving assistance instruction information), the controller 3 causes the indicator portion 65 of the front left image 62L to be displayed in red or the like. Thus, the front left image 62L is relatively likely to be viewed. Consequently, the vehicle driving assistance device 1 can notify the driver of the vehicle V that the vehicle V is likely to deviate from the lane toward left, and warn the driver to pay attention to the left side of the vehicle V. The controller 3 can cause the display unit 2 to display not only the deviation of the lane illustrated in FIG. 1 but also the notification of the driving state of the vehicle V, such as prevention of collision, approach to another vehicle like a vehicle in front and to an obstacle, and the like. This is possible by changing the display mode of the indicator portion 65 of either or both of the front left image 62L and the front right image 62R.

The controller 3 may also not display the front image 61 representing the front pattern 51 and the sub-front image 63, in a suitable manner, based on an input operation by the driver and the like on an operation unit, which is not illustrated, or based on a mode change of the driving assistance that is automatically switched by the processing unit that performs the process of the driving assistance system in the vehicle V. Also, as illustrated in FIG. 4, the controller 3 may also not display the forward image 50.

The vehicle driving assistance device 1 described above includes the display unit 2 and the controller 3. The display unit 2 can display the front pattern 51 that is a pattern shaped like the vehicle front VF of the vehicle V being positioned within the forward view, by superimposing the front pattern 51 on the forward image 50 that is an image of the forward view of the vehicle V. The controller 3 can execute the process of controlling the display unit 2 and causing the display unit 2 to display the driving assistance information for the vehicle V, using the front pattern 51.

In this manner, the vehicle driving assistance device 1 can perform the driving assistance in combination with the displaying of the forward view of the vehicle V. This is because the display unit 2 displays the front pattern 51 that is shaped like the vehicle front VF of the vehicle V, by superimposing the front pattern 51 on the forward image 50 of the vehicle V, and displays the driving assistance information for the vehicle V using the front pattern 51, by the control of the controller 3. Consequently, the vehicle driving assistance device 1 can display the fact that the forward image 50 is the forward image of the vehicle V in an easily understandable manner, by making the front pattern 51 as a mark of the position of the own vehicle in the forward image 50. In addition, the vehicle driving assistance device 1 can display the driving assistance in an easily understandable manner, by using the front pattern 51 to display the driving assistance system.

More specifically, in the vehicle driving assistance device 1 described above, the display unit 2 displays the front pattern 51, by superimposing the front pattern 51 on the forward image 50, at a position corresponding to the position of the vehicle front VF in the forward view. Thus, the vehicle driving assistance device 1 can display the front pattern 51 by superimposing the front pattern 51 on the forward image 50 so that the position of the vehicle front VF in the actual forward view and the position of the front pattern 51 in the forward image 50 have an equivalent positional relation. Consequently, it is possible to allow the driver to intuitively understand the positional relation between the forward image 50 and the own vehicle.

Also, in the vehicle driving assistance device 1 described above, the front pattern 51 includes the main front pattern 52 that includes the front-to-rear direction patterns 52a and 52b and the left-to-right direction patterns 52c and 52d. The front-to-rear direction patterns 52a and 52b are in the forward image 50 along the virtual vehicle front-to-rear direction. The left-to-right direction patterns 52c and 52d are in the forward image 50 along the virtual vehicle left-to-right direction that intersects with the virtual vehicle front-to-rear direction, and respectively intersect with the front-to-rear direction patterns 52a and 52b to form corners C. Consequently, in the virtual space represented by the forward image 50, the vehicle driving assistance device 1 can display the main front pattern 52 that is an abstraction of the shape of the vehicle front VF of the vehicle V and that is represented by a perspective view, by superimposing the main front pattern 52 on the forward image 50, using the front-to-rear direction patterns 52a and 52b, the left-to-right direction patterns 52c and 52d, and the corners C that are formed at the intersections of the front-to-rear direction patterns 52a and 52b and the left-to-right direction patterns 52c and 52d.

Also, in the vehicle driving assistance device 1 described above, the main front pattern 52 includes a pair of main front patterns in which the front-to-rear direction patterns 52a and 52b and the left-to-right direction patterns 52c and 52d face each other in a line symmetric manner with respect to the reference line L1 that is orthogonal to the virtual vehicle left-to-right direction, and the pair of the left-to-right direction patterns 52c and 52d are positioned between the pair of the corners C. The ends at the side opposite from the corners C of the front-to-rear direction patterns 52a and 52b extend to the periphery of the forward image 50. Consequently, the vehicle driving assistance device 1 can further match the main front pattern 52 that is displayed by being superimposed on the forward image 50, with an actual landscape viewed by the driver. The vehicle driving assistance device 1 can then display the front left pattern 52L and the front right pattern 52R in an easily understandable manner by separating the front left pattern 52L and the front right pattern 52R as separate patterns. The front left pattern 52L is shaped like the corner at the forward side in the vehicle front-to-rear direction as well as at the left side in the vehicle left-to-right direction, of the vehicle front VF, by a set of the front-to-rear direction pattern 52a, the left-to-right direction pattern 52c, and the corner C. The front right pattern 52R is shaped like the corner at the forward side in the vehicle front-to-rear direction as well as at the right side in the vehicle left-to-right side, of the vehicle front VF, by another set of the front-to-rear direction pattern 52b, the left-to-right direction pattern 52d, and the corner C. Consequently, it is possible to separately perform the notification relating to the left side in the vehicle left-to-right direction and the notification relating to the right side in the vehicle left-to-right direction.

Also, in the vehicle driving assistance device 1 described above, the front pattern 51 includes the sub-front pattern 53 that surrounds the main front pattern 52, and visibly transmits the forward image 50 that is superimposed with the main front pattern 52 and the sub-front pattern 53. Consequently, the vehicle driving assistance device 1 can display the front pattern 51 that is shaped like the vehicle front VF with more reality, using the main front pattern 52 and the sub-front pattern 53. Also, even if the main front pattern 52 and the sub-front pattern 53 are superimposed on the forward image 50, the vehicle driving assistance device 1 can prevent the main front pattern 52 and the sub-front pattern 53 from blocking the forward image 50 from being visible.

Also, in the vehicle driving assistance device 1 described above, the controller 3 can execute the process of causing the display unit 2 to display the notification of the driving state of the vehicle V, by changing the display mode of the front pattern 51, as the driving assistance display. Consequently, the vehicle driving assistance device 1 can use the front pattern 51 for displaying the notification of the driving state of the vehicle V, as an example of the driving assistance display.

Also, in the vehicle driving assistance device 1 described above, the display unit 2 can display the front image 61 that is an image representing the front pattern 51, by superimposing the front image 61 on the forward image 50. Consequently, the vehicle driving assistance device 1 can display the front pattern 51 by superimposing the front pattern 51 on the forward image 50, in a simple configuration.

The vehicle driving assistance device according to the presently disclosed subject matter described above is not limited to the embodiment described above, and various modifications are possible within the scope of the appended claims.

Figure 6:
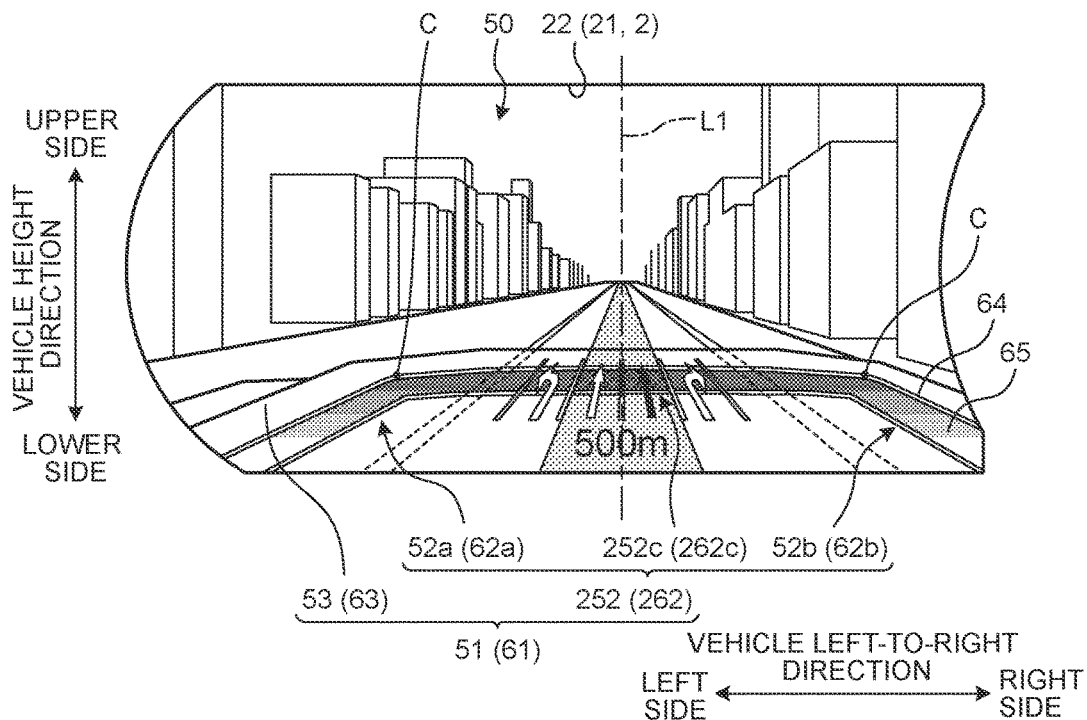
FIG. 6 is a front elevation view illustrating a schematic configuration of a main display area of a vehicle driving assistance device according to another modified embodiment.
Figure 7:
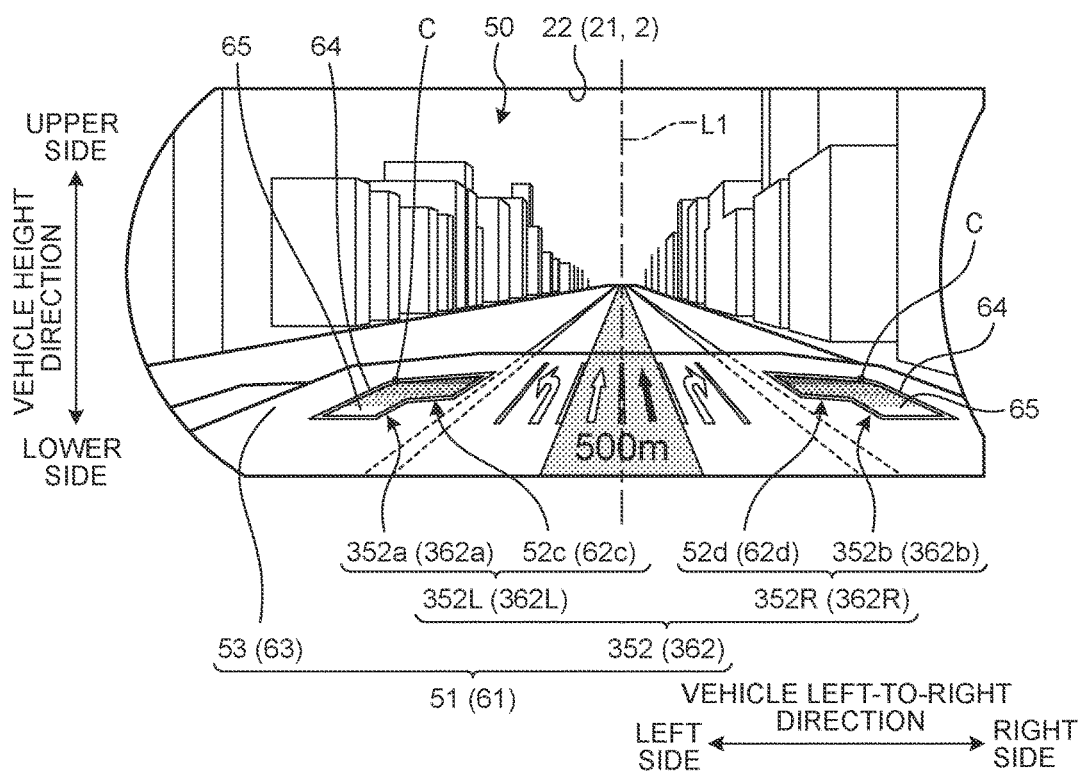
FIG. 7 is a front elevation view illustrating a schematic configuration of a main display area of a vehicle driving assistance device according to another modified embodiment.
Figure 8:
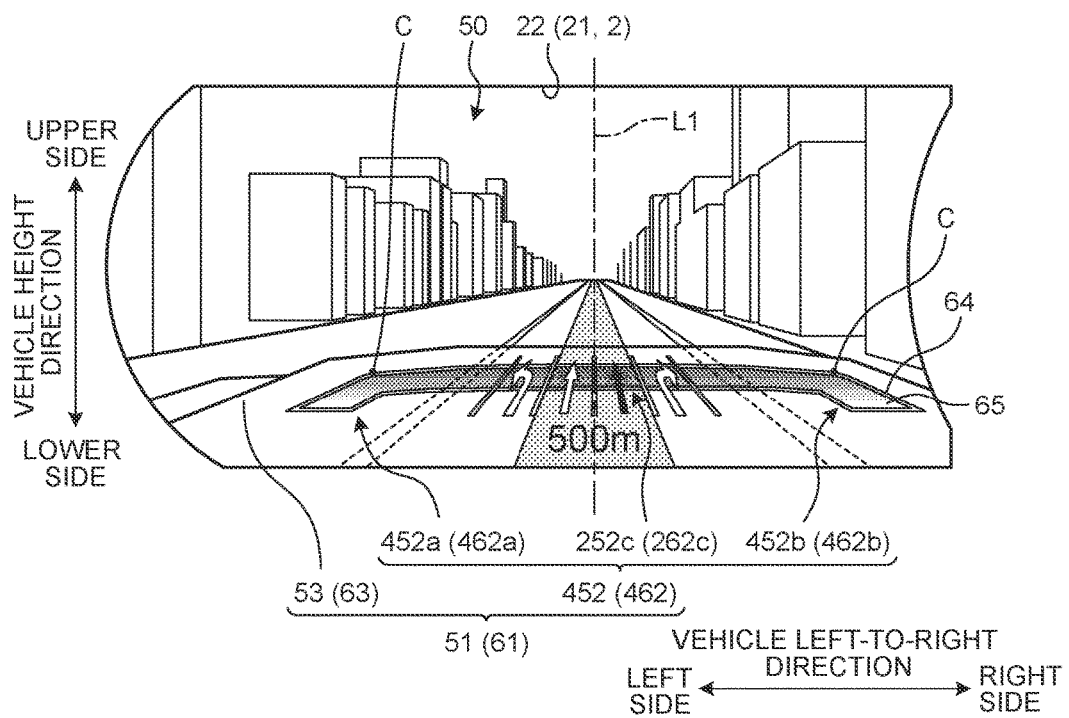
FIG. 8 is a front elevation view illustrating a schematic configuration of a main display area of a vehicle driving assistance device according to another modified embodiment.

The shape of the main front pattern 52 described above is not limited to the above described shape. FIG. 6, FIG. 7, and FIG. 8 are front elevation views each illustrating a schematic configuration of a main display area of a vehicle driving assistance device according to a modification.

A main front pattern 252 according to a modification illustrated in FIG. 6 includes the front-to-rear direction patterns 52a and 52b, and a left-to-right direction pattern 252c. The main front pattern 252 is different from the main front pattern 52 described above, in including the single left-to-right direction pattern 252c instead of the pair of the left-to-right direction pattern 52c and the left-to-right direction pattern 52d. Similar to the left-to-right direction patterns 52c and 52d described above, the left-to-right direction pattern 252c of the present modification is a pattern in the forward image 50 along the virtual vehicle left-to-right direction, and respectively intersect with the front-to-rear direction patterns 52a and 52b to form corners C. The main front pattern 252 is provided in which the front-to-rear direction patterns 52a and 52b and the left-to-right direction pattern 252c face each other in a line symmetric manner with respect to the reference line L1, and the single left-to-right direction pattern 252c is positioned between the pair of corners C formed by the front-to-rear direction patterns 52a and 52b and the left-to-right direction pattern 252c. In other words, in the main front pattern 252, the single left-to-right direction pattern 252c is positioned in a non-separate manner between the pair of the front-to-rear direction pattern 52a and the front-to-rear direction pattern 52b. One corner C is formed when the front-to-rear direction pattern 52a intersects with the left-to-right direction pattern 252c, and another corner C is formed when the front-to-rear direction pattern 52b intersects with the left-to-right direction pattern 252c. Consequently, the main front pattern 252 is formed substantially in a U-shape as a whole, and is shaped like both the corner that is at the forward side in the vehicle front-to-rear direction as well as at the left side in the vehicle left-to-right direction, of the vehicle front VF, and the corner that is at the forward side in the vehicle front-to-rear direction as well as at the right side in the vehicle left-to-right direction, of the vehicle front VF, by the front-to-rear direction patterns 52a and 52b and the left-to-right direction pattern 252c. In this example, a main front image 262 representing the main front pattern 252 includes the front-to-rear direction image 62a representing the front-to-rear direction pattern 52a, the front-to-rear direction image 62b representing the front-to-rear direction pattern 52b, and a left-to-right direction image 262c representing the left-to-right direction pattern 252c. In this example, the vehicle driving assistance device 1 can display the vehicle front VF that includes the corners at both sides of the vehicle left-to-right direction, by the front-to-rear direction patterns 52a and 52b, the left-to-right direction pattern 252c, and the corners C, in an easily understandable manner. Consequently, for example, it is possible to allow the driver to further clearly recognize the border at the forward side in the vehicle front-to-rear direction.

A main front pattern 352 according to a modification illustrated in FIG. 7 includes front-to-rear direction patterns 352a and 352b and the left-to-right direction patterns 52c and 52d. The main front pattern 352 is different from the main front pattern 52 described above, in including a pair of the front-to-rear direction patterns 352a and 352b, instead of the pair of the front-to-rear direction patterns 52a and 52b. Similar to the front-to-rear direction patterns 52a and 52b described above, the front-to-rear direction patterns 352a and 352b of the present modification are patterns in the forward image 50 along the virtual vehicle front-to-rear direction. The main front pattern 352 includes a pair of main front patterns in which the front-to-rear direction patterns 352a and 352b and the left-to-right direction patterns 52c and 52d face each other in a line symmetric manner with respect to the reference line L1, and the pair of the left-to-right direction patterns 52c and 52d are positioned between a pair of corners C that are formed by the front-to-rear direction patterns 352a and 352b and the left-to-right direction patterns 52c and 52d. The front-to-rear direction pattern 352a at the left side in the virtual vehicle left-to-right direction and the left-to-right direction pattern 52c at the left side in the virtual vehicle left-to-right direction intersect with each other to form a corner C, and form a front left pattern 352L that is shaped like the corner at the forward side in the vehicle front-to-rear direction as well as at the left side in the vehicle left-to-right direction, of the vehicle front VF. The front-to-rear direction pattern 352b at the right side in the virtual vehicle left-to-right direction and the left-to-right direction pattern 52d at the right side in the virtual vehicle left-to-right direction intersect with each other to form a corner C, and form a front right pattern 352R that is shaped like the corner at the forward side in the vehicle front-to-rear direction as well as at the right side in the vehicle left-to-right direction, of the vehicle front VF. In the main front pattern 352, the ends at the side opposite from the corners C of the front-to-rear direction patterns 352a and 352b do not extend to the periphery of the lower side of the forward image 50 in the vehicle height direction (in other words, the periphery of the lower side of the main display area 22 in the vehicle height direction). In this example, a main front image 362 representing the main front pattern 352 includes a front-to-rear direction image 362a representing the front-to-rear direction pattern 352a, a front-to-rear direction image 362b representing the front-to-rear direction pattern 352b, the left-to-right direction image 62c representing the left-to-right direction pattern 52c, and the left-to-right direction image 62d representing the left-to-right direction pattern 52d. The front-to-rear direction image 362a and the left-to-right direction image 62c form a front left image 362L representing the front left pattern 352L. The front-to-rear direction image 362b and the left-to-right direction image 62d form a front right image 362R representing the front right pattern 352R. Even in this case, the vehicle driving assistance device 1 can display the vehicle front VF in an easily understandable manner, by the front-to-rear direction patterns 352a and 352b, the left-to-right direction patterns 52c and 52d, and the corners C.

A main front pattern 452 according to a modification illustrated in FIG. 8 includes front-to-rear direction patterns 452a and 452b, and the left-to-right direction pattern 252c. The main front pattern 452 is different from the main front pattern 252 described above, in including a pair of the front-to-rear direction patterns 452a and 452b, instead of the pair of the front-to-rear direction patterns 52a and 52b. Similar to the front-to-rear direction patterns 352a and 352b described above, the front-to-rear direction patterns 452a and 452b of the present modification are patterns in the forward image 50 along the virtual vehicle front-to-rear direction. The main front pattern 452 is provided in which the front-to-rear direction patterns 452a and 452b and the left-to-right direction pattern 252c face each other in a line symmetric manner with respect to the reference line L1, and the single left-to-right direction pattern 252c is positioned between a pair of corners C that are formed by the front-to-rear direction patterns 452a and 452b and the left-to-right direction pattern 252c. In other words, in the main front pattern 452, the single left-to-right direction pattern 252*c* is positioned in a non-separate manner between the pair of the front-to-rear direction pattern 452*a* and the front-to-rear direction pattern 452*b*. Also, one corner C is formed when the front-to-rear direction pattern 452*a* intersects with the left-to-right direction pattern 252*c*, and another corner C is formed when the front-to-rear direction pattern 452*b* intersects with the left-to-right direction pattern 252*c*. In the main front pattern 452, the ends at the side opposite from the corners C of the front-to-rear direction patterns 452*a* and 452*b* do not extend to the periphery of the lower side of the forward image 50 in the vehicle height direction (in other words, the periphery of the lower side of the main display area 22 in the vehicle height direction). In this example, a main front image 462 representing the main front pattern 452 includes a front-to-rear direction image 462*a* representing the front-to-rear direction pattern 452*a*, a front-to-rear direction image 462*b* representing the front-to-rear direction pattern 452*b*, and the left-to-right direction image 262*c* representing the left-to-right direction pattern 252*c*. Even in this case, the vehicle driving assistance device 1 can display the vehicle front VF in an easily understandable manner, by the front-to-rear direction patterns 452*a* and 452*b*, the left-to-right direction pattern 252*c*, and the corners C.

In the above explanation, the main front pattern 52 is an abstraction of the shape of the actual vehicle front VF that can be viewed through the front window, and the sub-front pattern 53 has the shape representing the exterior shape of the actual vehicle front VF almost as it is. However, it is not limited thereto, as long as the main front pattern 52 and the sub-front pattern 53 are patterns shaped like the vehicle front VF. In the above explanation, the front pattern 51 described above includes the main front pattern 52 and the sub-front pattern 53. However, it is not limited thereto, and for example, the front pattern 51 may not include the sub-front pattern 53.

In the above explanation, for example, the controller 3 described above changes the display mode by changing the hue, tone, value, size, and the like of the indicator portion 65 in the main front image 62, and causes the display unit 2 to display the notification of the driving state of the vehicle V. However it is not limited thereto. For example, the controller 3 may also cause the display unit 2 to display the notification of the driving state of the vehicle V, by dynamically changing the shape of the main front image 62 (front left image 62L, the front right image 62R, and the like) representing the main front pattern 52, or by flickering the main front image 62. Also, for example, the controller 3 may cause the display unit 2 to display the notification of the driving state of the vehicle V, by changing the display mode of the sub-front image 63 representing the sub-front pattern 53, as the driving assistance display.

In the above explanation, the vehicle driving assistance device 1 is applied to a part of the vehicle display device 100. However, it is not limited thereto, and the vehicle driving assistance device 1 may be applied to a navigation system. In this case, the display unit 2 is also used as a display device of the navigation system.

Figure 9:
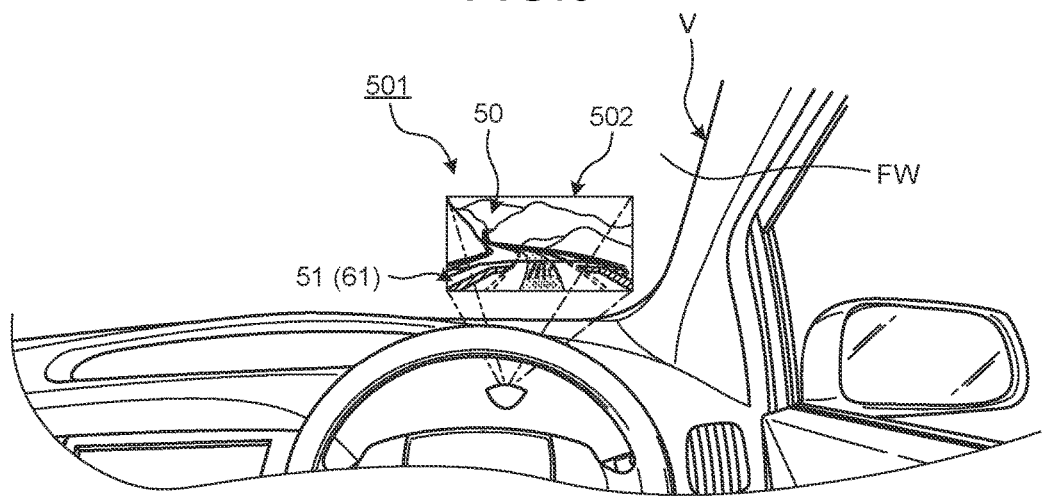
FIG. 9 is a schematic diagram illustrating a schematic configuration of a display unit of a vehicle driving assistance device according to another modified embodiment.

For example, the vehicle driving assistance device 1 may also be applied to what is called a head-up display. FIG. 9 is a schematic diagram illustrating a schematic configuration of a display unit of a vehicle driving assistance device according to a modification. In this case, for example, instead of using the display unit 2, a vehicle driving assistance device 501 according to the modification illustrated in FIG. 9 may include a display unit 502 that is a part of a front window FW of the vehicle V on which a virtual image is projected by the head-up display. The front image 61 representing the front pattern 51 can be displayed by superimposing the front image 61 on the forward image 50. Even in this case, the vehicle driving assistance device 501 can perform the driving assistance in combination with the displaying of the forward view side of the vehicle V.

Figure 10:
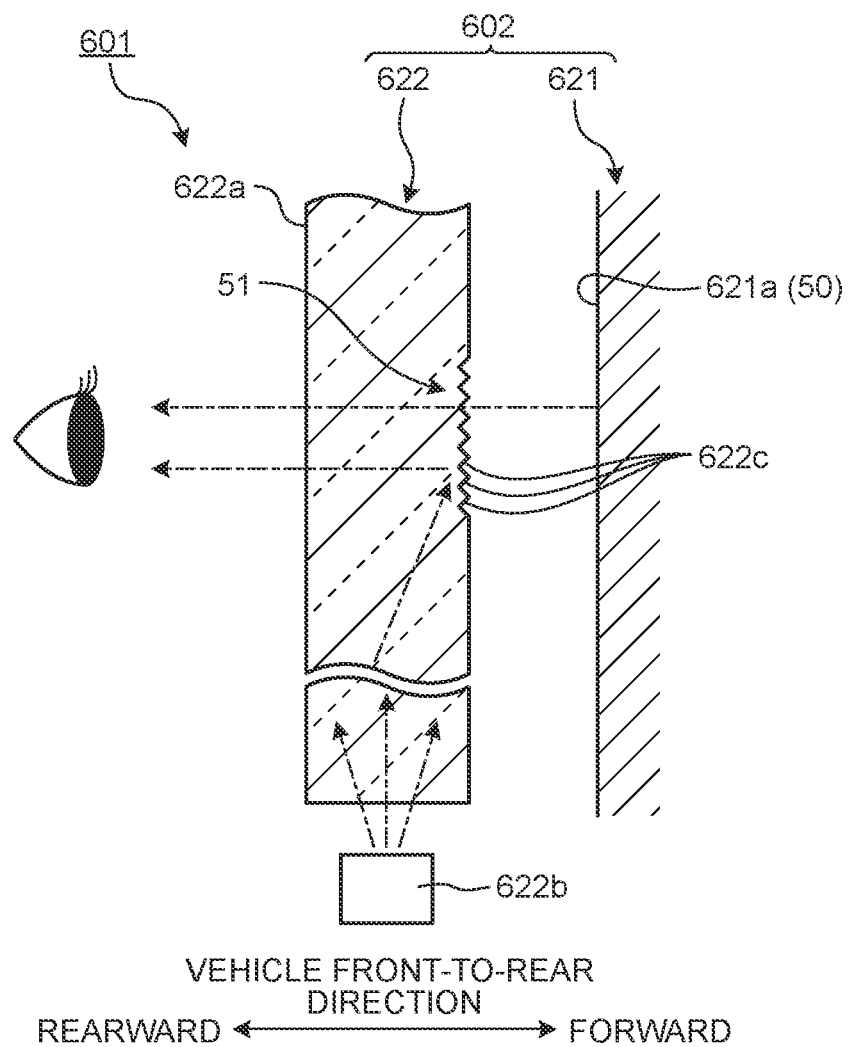
FIG. 10 is a sectional view illustrating a schematic configuration of a display unit of a vehicle driving assistance device according to another modified embodiment.

In the above explanation, an image display device such as a liquid crystal display is used for the display unit 2. However, it is not limited thereto. FIG. 10 is a sectional view illustrating a schematic configuration of a display unit of a vehicle driving assistance device according to a modification. For example, instead of using the display unit 2, a vehicle driving assistance device 601 according to the modification illustrated in FIG. 10 may include a display unit 602 that can display the front pattern 51 by superimposing the front pattern 51 on the forward image 50, using what is called a two-layered display device.

The display unit 602 with a two-layered display includes a display 621 and a superposition display device 622. The display 621 is driven and controlled via the controller 3 (see FIG. 3) and the like, and displays various images on an image display surface 621*a*. The display 621 is a display device that is placed at the forward side in the vehicle front-to-rear direction, in the display unit 602 with a two-layered display. Typically, the display 621 displays the forward image 50 (see also FIG. 1 and the like) on the image display surface 621*a*. Similar to the display unit 2 described above, for example, a thin liquid crystal display may be used for the display 621. However, it is not limited thereto, and a plasma display, an organic EL display, and the like may also be used.

The superposition display device 622 is a display device that is placed at the rearward side in the vehicle front-to-rear direction (between the display 621 and the driver), in the display unit 602 with a two-layered display. Typically, the superposition display device 622 displays the front pattern 51 (see also FIG. 1 and the like). The superposition display device 622 includes a transparent light guiding plate 622*a* and a light source 622*b*. The transparent light guiding plate 622*a* is provided on the top of the front surface side of the image display surface 621*a*. The transparent light guiding plate 622*a* is formed of a transparent member (transparent medium) having transparency through which the light emitted from the display 621 transmits. Fine grooves 622*c* that form the front pattern 51 are provided on the transparent light guiding plate 622*a*. For example, the grooves 622*c* that form the front pattern 51 are formed in a concave shape, on the main surface of the transparent light guiding plate 622*a*. In this example, the grooves 622*c* are formed on the main surface of the transparent light guiding plate 622*a* facing the image display surface 621*a*. The light source 622*b* irradiates the end surface of the transparent light guiding plate 622*a* with light. For example, the light source 622*b* is configured of light emitting diode (LED) elements and the like, but it is not limited thereto. The optical axis direction of the light source 622*b* is orthogonal to the end surface of the transparent light guiding plate 622*a*, and the emitted light enters from the end surface of the transparent light guiding plate 622*a*. In the superposition display device 622, the light source 622*b* is driven and controlled via the controller 3 (see FIG. 3) to cause the front pattern 51 to be displayed or not displayed in a switching manner in response to the light source 622*b* being turned on or turned off. In the superposition display device 622, the front pattern 51 is displayed when the light source 622*b* is turned on. In other words, the light emitted from the light source 622*b* enters the end surface of the transparent light guiding plate 622*a* and propagates through the transparent light guiding plate 622*a*, and at least a part of the components of the incident light reflects toward the front surface side by the grooves 622*c* that form the front pattern 51. As a result, the driver and the like can view the front pattern 51. In this case, in the superposition display device 622, when the driver views from the front surface side (driver's seat side), the front pattern 51 that is displayed on the transparent light guiding plate 622*a* can be displayed by superimposing the front pattern 51 on the forward image 50 that is displayed on the image display surface 621*a* of the display 621. On the other hand, in the superposition display device 622, the front pattern 51 is not displayed when the light source 622*b* is turned off. Thus, the driver and the like can easily view various images that are displayed on the image display surface 621*a*, by the light that is emitted from the display 621 and that has transmitted through the transparent light guiding plate 622*a*.

In this manner, the display unit 602 can display the front pattern 51 by superimposing the front pattern 51 on the forward image 50, using the display 621 and the superposition display device 622. Consequently, the display unit 602 can display a three-dimensional image with more feeling of depth. The controller 3 can execute a process of controlling the display unit 602 and causing the display unit 602 to display the driving assistance information for the vehicle V using the front pattern 51. In this case, for example, the controller 3 executes a process of causing the display unit 602 to display the notification of the driving state of the vehicle V by controlling the display 621 and changing the display mode of the image at the portion where the front pattern 51 is superimposed to change the display mode of the front pattern 51 as the driving assistance display. For example, if there are light sources such as red, green, blue, and the like provided as the light source 622*b*, the controller 3 switches the display color of the front pattern 51 by turning on and turning off the red, green and blue light sources, individually in a switching manner to change the display mode. Hence, the controller 3 can execute the process of causing the display unit 602 to display the notification of the driving state of the vehicle V. In other words, the display unit 602 need not display both images of the forward image 50 and the front pattern 51. By adopting the two-layered display device as described above, it is possible to display the front pattern 51 by superimposing the front pattern 51 on the forward image 50, without displaying the front pattern 51 as an image, and display the driving assistance using the front pattern 51. Even in this case, the vehicle driving assistance device 601 can perform the driving assistance in combination with the displaying of the forward view side of the vehicle V.

For example, the configuration of the display unit is not limited to the above, and the display unit may also display the front pattern superimposed on the forward image by adhering a transparent sheet printed with the front pattern 51 on the display surface of the display.

The vehicle driving assistance device according to the embodiments can advantageously perform driving assistance in combination with the displaying of the forward view side of the vehicle, because the display unit displays the front pattern that is shaped like the vehicle front of the vehicle, by superimposing the front pattern on the forward image of the vehicle, and displays driving assistance of the vehicle using the front pattern, by the control of the controller.

Although the presently disclosed subject matter has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle driving assistance device, comprising:

a vehicle state detection unit that includes at least one of a camera, a radar, a sonar, a vehicle speed sensor, an acceleration sensor, and a GPS receiver;

a display unit configured to display a front pattern that is a pattern shaped like a vehicle front of a vehicle positioned within a forward view of the vehicle, and to superimpose the front pattern on a forward image that is an image of the forward view of the vehicle; and a controller in electrical communication with each of the vehicle state detection unit and the display unit, and configured to execute a process of controlling the display unit and causing the display unit to display driving assistance information for the vehicle, using the front pattern, based on data received from the vehicle state detection unit, wherein the front pattern serves as a mark of a virtual position of the vehicle on the forward image, the front pattern includes a front-to-rear direction pattern in the forward image along a virtual vehicle front-to-rear direction, and a left-to-right direction pattern that is in the forward image along a virtual vehicle left-to-right direction intersecting with the virtual vehicle front-to-rear direction and that forms a corner by intersecting with the front-to-rear direction pattern, the controller is configured to execute the process of controlling the display unit and causing the display unit to display driving assistance information for the vehicle by determining one of an alarm condition and a normal condition based on data received from the vehicle state detection unit, the controller displays a normal display on the display unit by displaying the front pattern in a first display mode in which the front pattern as one of a first pattern image that blends with the forward image and a second pattern image that has a first color indicative of the normal condition when the controller determines the normal condition, and the controller displays an alarm display calling attention on the display unit by displaying the front pattern in a second display mode in which the front pattern contrasts with the forward image and is different from the front pattern displayed in the first display mode such that the front pattern is viewed as the driving assistance information when the controller determines the alarm condition.

2. The vehicle driving assistance device according to claim 1, wherein the display unit is configured to display the front pattern by superimposing the front pattern on the forward image, at a position corresponding to a position of the vehicle front in the forward view.

3. The vehicle driving assistance device according to claim 1, wherein the main front pattern includes a pair of main front patterns in which the front-to-rear direction patterns and the left-to-right direction patterns face each other in a line symmetric manner with respect to a reference line that is orthogonal to the virtual vehicle left-to-right direction, and the pair of the left-to-right direction patterns are positioned between a pair of the corners, and ends at a side opposite from the corners of the front-to-rear direction patterns extend to a periphery of the forward image.

4. The vehicle driving assistance device according to claim 1, wherein the image of the forward view of the vehicle is a virtual image.

5. The vehicle driving assistance device according to claim 1, wherein
the controller displays the front pattern on the display unit by separating the front pattern into a frame portion that is being hollowed out and an indicator portion that is surrounded by the frame portion, and displays the alarm display on the display unit by changing a display mode of the indicator portion from the first display mode to the second display mode.

6. The vehicle driving assistance device according to claim 1, wherein
the front-to-rear direction pattern and the left-to-right direction pattern form an L-shaped front pattern.

7. The vehicle driving assistance device according to claim 1, wherein
the front pattern is split into a left front pattern and a right front pattern that are spaced apart from each other and face each other in a line symmetric manner.

8. The vehicle driving assistance device according to claim 1, wherein
the front pattern includes,
a main front pattern that includes the front-to-rear direction pattern and the left-to-right direction pattern, and
a sub-front pattern that surrounds the main front pattern and is a virtual representation of an exterior shape of the vehicle.

9. A vehicle driving assistance device, comprising:
a vehicle state detection unit that includes at least one of a camera, a radar, a sonar, a vehicle speed sensor, an acceleration sensor, and a GPS receiver;
a display unit configured to display a front pattern that is a pattern shaped like a vehicle front of a vehicle positioned within a forward view of the vehicle, and to superimpose the front pattern on a forward image that is an image of the forward view of the vehicle; and
a controller in electrical communication with each of the vehicle state detection unit and the display unit, and configured to execute a process of controlling the display unit and causing the display unit to display driving assistance information for the vehicle, using the front pattern, based on data received from the vehicle state detection unit; wherein
the front pattern includes a main front pattern that includes a front-to-rear direction pattern in the forward image along a virtual vehicle front-to-rear direction, and a left-to-right direction pattern that is in the forward image along a virtual vehicle left-to-right direction intersecting with the virtual vehicle front-to-rear direction and that forms a corner by intersecting with the front-to-rear direction pattern, and
the front-to-rear direction pattern extends farther in the virtual vehicle front-to-rear direction than the left-to-right direction pattern extends in the virtual vehicle front-to-rear direction, wherein
the front pattern serves as a mark of a virtual position of the vehicle on the forward image,
the controller is configured to execute the process of controlling the display unit and causing the display unit to display driving assistance information for the vehicle by determining one of an alarm condition and a normal condition based on data received from the vehicle state detection unit,
the controller displays a normal display on the display unit by displaying the front pattern in a first display mode in which the front pattern as one of a first pattern image that blends with the forward image and a second pattern image that has a first color indicative of the normal condition when the controller determines the normal condition, and
the controller displays an alarm display calling attention on the display unit by displaying the front pattern in a second display mode in which the front pattern contrasts with the forward image and is different from the front pattern displayed in the first display mode such that the front pattern is viewed as the driving assistance information when the controller determines the alarm condition.

10. The vehicle driving assistance device according to claim 9, wherein
the left-to-right direction pattern extends farther in the virtual vehicle left-to-right direction than the front-to-rear direction pattern extends in the virtual vehicle left-to-right direction.

11. A vehicle driving assistance device, comprising:
a vehicle state detection unit that includes at least one of a camera, a radar, a sonar, a vehicle speed sensor, an acceleration sensor, and a GPS receiver;
a display unit configured to display a front pattern that is a pattern shaped like a vehicle front of a vehicle positioned within a forward view of the vehicle, and to superimpose the front pattern on a forward image that is an image of the forward view of the vehicle; and
a controller in electrical communication with each of the vehicle state detection unit and the display unit, and configured to execute a process of controlling the display unit and causing the display unit to display driving assistance information for the vehicle, using the front pattern, based on data received from the vehicle state detection unit; wherein
the front pattern includes a front-to-rear direction pattern that is at a left side of a virtual vehicle left-to-right direction and a left-to-right direction pattern that is at a left side of the virtual vehicle left-to-right direction intersect with each other to form a corner, and form a front left pattern that is shaped like a corner at a forward side in an actual vehicle font-to-rear direction as well as at a left side in an actual vehicle left-to-right direction, of a vehicle front, wherein
the front pattern serves as a mark of a virtual position of the vehicle on the forward image,
the controller is configured to execute the process of controlling the display unit and causing the display unit to display driving assistance information for the vehicle by determining one of an alarm condition and a normal condition based on data received from the vehicle state detection unit,
the controller displays a normal display on the display unit by displaying the front pattern in a first display mode in which the front pattern as one of a first pattern image that blends with the forward image and a second pattern image that has a first color indicative of the normal condition when the controller determines the normal condition, and
the controller displays an alarm display calling attention on the display unit by displaying the front pattern in a second display mode in which the front pattern contrasts with the forward image and is different from the front pattern displayed in the first display mode such that the front pattern is viewed as the driving assistance information when the controller determines the alarm condition.

* * * * *